(12) United States Patent
Dalmazzo

(10) Patent No.: US 9,711,842 B2
(45) Date of Patent: Jul. 18, 2017

(54) ANTENNA ALIGNMENT DEVICE AND CLAMP

(71) Applicant: Enzo Dalmazzo, Miami, FL (US)

(72) Inventor: Enzo Dalmazzo, Miami, FL (US)

( * ) Notice: Subject to any disclaimer, the term of this patent is extended or adjusted under 35 U.S.C. 154(b) by 272 days.

(21) Appl. No.: 14/483,790

(22) Filed: Sep. 11, 2014

(65) Prior Publication Data

US 2015/0097736 A1 Apr. 9, 2015

Related U.S. Application Data

(63) Continuation-in-part of application No. 14/213,076, filed on Mar. 14, 2014.

(60) Provisional application No. 61/798,130, filed on Mar. 15, 2013.

(51) Int. Cl.
*H01Q 1/24* (2006.01)
*H01Q 1/42* (2006.01)
*G01S 19/14* (2010.01)
*H01Q 1/12* (2006.01)

(52) U.S. Cl.
CPC ............ *H01Q 1/243* (2013.01); *G01S 19/14* (2013.01); *H01Q 1/125* (2013.01); *H01Q 1/42* (2013.01)

(58) Field of Classification Search
CPC .......... H01Q 1/243; H01Q 1/125; H01Q 1/42; G01S 19/14
USPC ........................................................ 343/702
See application file for complete search history.

(56) References Cited

U.S. PATENT DOCUMENTS

| 4,101,892 | A | 7/1978 | Alford |
|---|---|---|---|
| 5,933,123 | A | 8/1999 | Kaul |
| 6,897,828 | B2 | 5/2005 | Boucher |
| 7,180,451 | B2 | 2/2007 | Silzer, Jr. |
| 8,018,374 | B2 | 9/2011 | Imai et al. |
| 8,077,113 | B2 | 12/2011 | Syed et al. |
| 8,188,714 | B2 | 5/2012 | Petrick et al. |
| 8,446,335 | B2 | 5/2013 | Frank |
| 8,610,629 | B2 | 12/2013 | Pascolini et al. |
| 8,665,160 | B2 | 3/2014 | Uttermann et al. |
| 2005/0035923 | A1* | 2/2005 | Syed ............... H01Q 19/022 343/872 |
| 2009/0021447 | A1* | 1/2009 | Austin .............. H01Q 1/125 343/880 |
| 2009/0201203 | A1 | 8/2009 | Le Sage et al. |
| 2010/0008028 | A1* | 1/2010 | Richardson ........... G06F 1/1626 361/679.01 |

(Continued)

OTHER PUBLICATIONS

SPAA05.COM SPAA05-EHC Specification; Dec. 10, 2010; http://www.spaa05.com/products/tools/ehc/index.php.

(Continued)

*Primary Examiner* — Jessica Han
*Assistant Examiner* — Bamidele A Jegede
(74) *Attorney, Agent, or Firm* — Mayback & Hoffman, P.A.; Gregory L. Mayback

(57) ABSTRACT

An antenna alignment device includes an enclosure. The enclosure has a top portion having a single radome and a bottom portion. The single radome has a one or more domes. The top portion and the bottom portion are attached to form a single mold. The single mold houses a global positioning system receiver and a plurality of antennas. Each of the plurality of antennas is covered by the single radome and a respective dome of the one or more domes. The single mold also houses an interconnect circuit board and a touch screen display.

19 Claims, 16 Drawing Sheets

(56) References Cited

U.S. PATENT DOCUMENTS

| | | | |
|---|---|---|---|
| 2011/0036747 A1* | 2/2011 | Petrick | G06F 1/1628 |
| | | | 206/701 |
| 2011/0090118 A1* | 4/2011 | Raeder | H01Q 3/005 |
| | | | 342/359 |
| 2011/0228192 A1* | 9/2011 | Hollaway | G02F 1/133308 |
| | | | 349/58 |
| 2012/0319895 A1 | 12/2012 | Bruchiel | |
| 2013/0012261 A1 | 1/2013 | Zhu et al. | |
| 2014/0016331 A1 | 1/2014 | Ting | |
| 2014/0051945 A1 | 2/2014 | Sarasua et al. | |

OTHER PUBLICATIONS

International Search Report and Written Opinion for International Application No. PCT/US2014/055297 dated Dec. 16, 2014.
MultiwavesSensors—Innovative Sensor Products; Apr. 6, 2016;http://www.multiwavesensors.com.
Sunsight Instruments—Antenna Alignment Solutions/Microwave/GPS/Azimuth Tools; Apr. 6, 2016; https://www.sunsight.com.

* cited by examiner

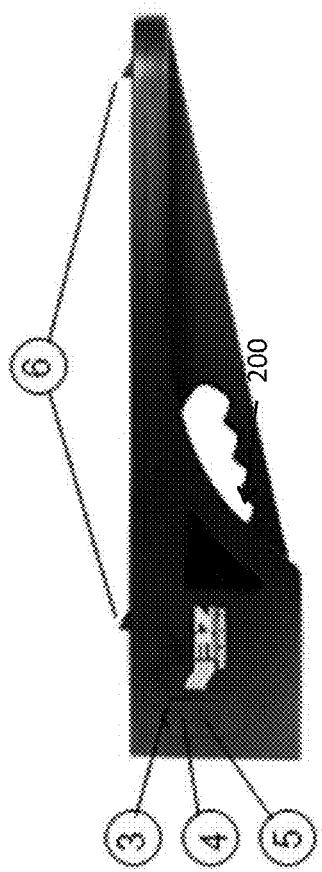
FIG. 3 Side View
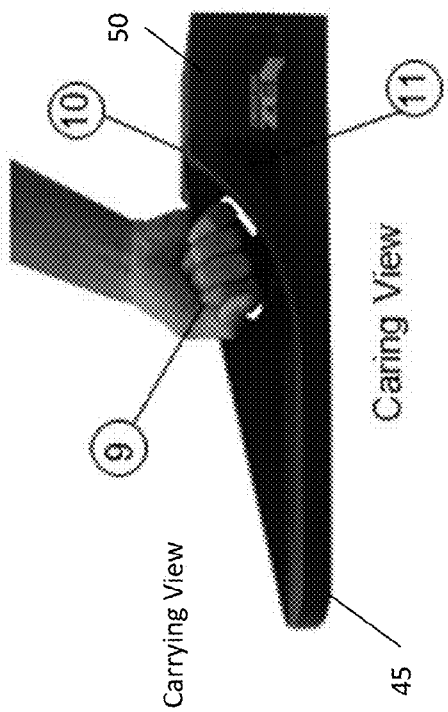
FIG. 5 Carrying View
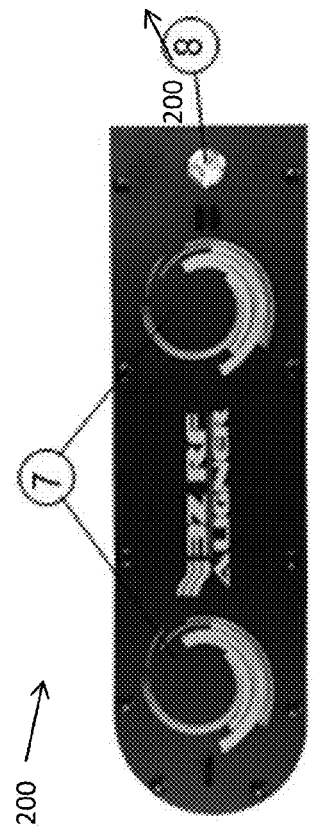
Rear View showing display
FIG. 2 Screen View
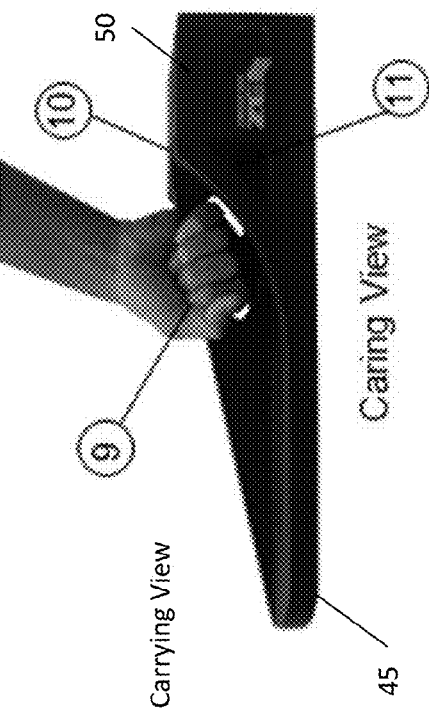
FIG. 4 Top View

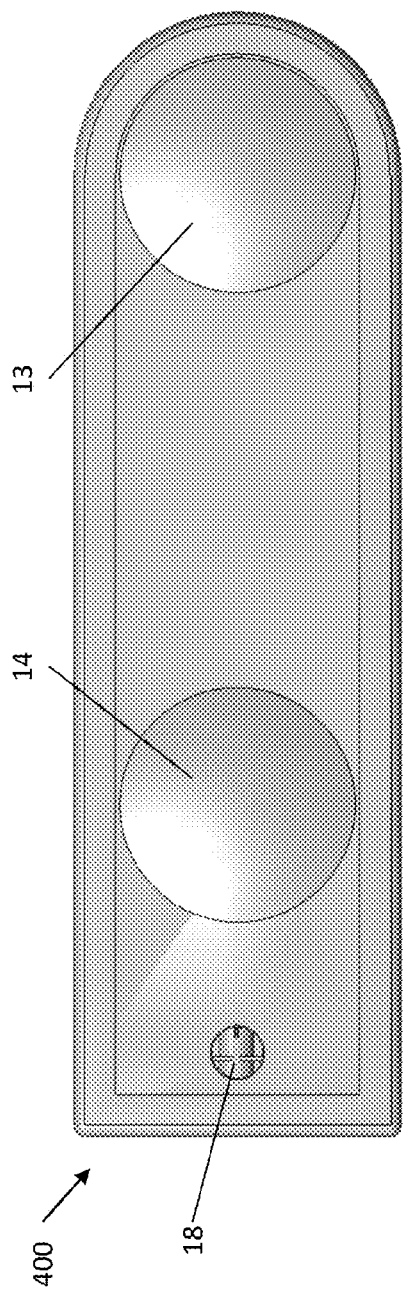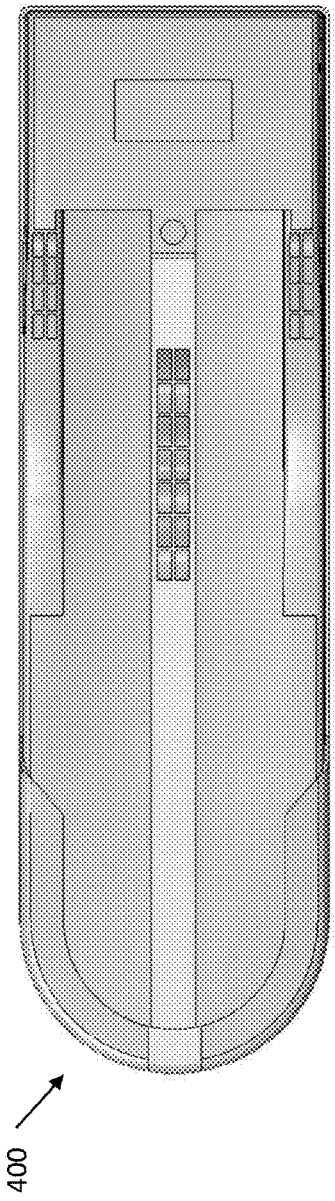
FIG. 19
FIG. 20

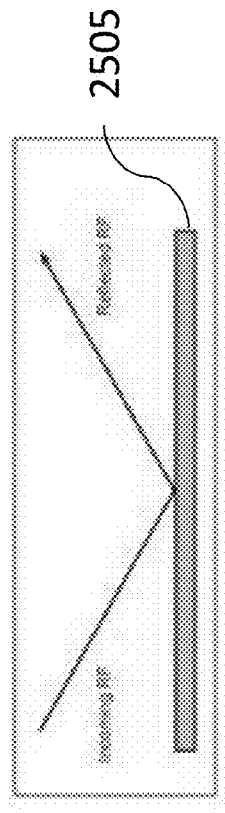
FIG. 25
FIG. 27
FIG. 26

ANTENNA ALIGNMENT DEVICE AND CLAMP

CROSS-REFERENCE TO RELATED APPLICATIONS

This application is a continuation-in-part of U.S. patent application Ser. No. 14/213,076 filed on Mar. 14, 2014 (which application claims priority to U.S. Provisional Application Ser. No. 61/798,130, filed on Mar. 15, 2013), the entire disclosures of which are hereby incorporated herein by reference in its entirety.

STATEMENT REGARDING FEDERALLY SPONSORED RESEARCH OR DEVELOPMENT

Not Applicable

FIELD OF THE INVENTION

The present invention lies in the field of telecommunications. The present disclosure relates to alignment of communication antennas.

BACKGROUND OF THE INVENTION

An essential part of a wireless service provider's business is its ability to provide adequate communication capabilities to its customers. In order to provide said capabilities, wireless service providers deploy communication antennas on towers, rooftops, buildings, and other tall structures. The height of such structures allows the radio signal from each communication antenna to travel several miles, establishing a geographic area within which service may be provided to customers. Wireless service providers typically install several directional communication antennas per site as multiple directional communication antennas are needed for increased capacity and reception.

In order to provide the required radio signal throughout a defined area, each directional antenna is intended to face a specific direction (referred to as "azimuth") relative to true north, to be inclined at a specific downward angle with respect to the horizontal in the plane of the azimuth (referred to as "downtilt") and to be vertically aligned with respect to the horizontal (referred to as "skew"). Undesired changes in azimuth, downtilt, and skew will detrimentally affect the coverage of a directional antenna. These alignments may be likened to the axes commonly used to describe the attitude of an aircraft: Azimuth corresponds to the yaw of an aircraft about a vertical axis; skew corresponds to the roll of an aircraft about its longitudinal axis; and downtilt corresponds to the pitch of the nose of an aircraft above or below a horizontal plane (or about a lateral axis extending horizontally through the aircraft at right angles to the longitudinal axis). In general, the more accurate the installation, the better the network performance that may be achieved within the area served by the antenna. Directional antenna installations are performed by tower companies who use certified tower climbers to carry out these installations.

Due to inaccurate and user subjective antenna installation techniques used by many tower companies, a need has grown for the use of GPS Antenna Alignment Devices. These devices for many years have been very large in size and challenging to attach to the host Antenna.

Thus, a need exists to overcome the problems with the prior art systems, designs, and processes as discussed above.

SUMMARY OF THE INVENTION

The invention provides an alignment device and a clamp that overcome the hereinafore-mentioned disadvantages of the heretofore-known devices and methods of this general type and that provide such features with an alignment device, that is smaller, lighter weight, easier to use. The alignment device is designed with the tower climber in mind and is also capable of calculating target azimuth and tilt parameters when installing point to point Microwave Dishes in addition to providing antenna alignments. Along with the alignment device a universal antenna clamp is provided for temporal attachment to an antenna during alignment.

With the foregoing and other objects in view, there is provided, in accordance with the invention, an antenna alignment device. In one embodiment, the antenna alignment device includes an enclosure. The enclosure has a top portion having a single radome and a bottom portion. The single radome has a one or more domes. The top portion and the bottom portion are attached to form a single mold. The single mold houses a global positioning system receiver and a plurality of antennas. Each of the plurality of antennas is covered by the single radome and a respective dome of the one or more domes. The single mold also houses an interconnect circuit board and a touch screen display.

In accordance with another feature of the invention, there is provided a shielded chamber within the enclosure that secures the touch screen display.

In accordance with a further feature of the invention, the shielding of the shielded chamber includes copper paint.

In accordance with an added feature of the invention, there is provided internal shielded wiring for an ON/OFF switch of the enclosure.

In accordance with an additional feature of the invention, there is provided a built-in carrying handle for the enclosure.

In accordance with yet another feature of the invention, the built-in carrying handle is part of the bottom portion of the enclosure.

In accordance with yet a further feature of the invention, there is provided an attachment mechanism to keep the antenna alignment device from falling.

In accordance with yet an added feature of the invention, the attachment mechanism includes at least one opening within the enclosure that allows the antenna alignment device to be tied down.

In accordance with yet an additional feature of the invention, the at least one opening is part of the bottom portion of the enclosure.

In accordance with again another feature of the invention, the enclosure includes a memory slot, a universal serial bus (USB) port, and a battery charging port.

In accordance with again a further feature of the invention, the enclosure includes a cover that protects, the memory slot, the USB port, and the battery charging port.

In accordance with again an added feature of the invention, the enclosure includes a mounting knob.

In accordance with again an additional feature of the invention, the mounting knob includes a single Pem-nut.

In accordance with another feature of the invention, the single mold houses a short range wireless transceiver.

In accordance with a further feature of the invention, a bumper is attached to the enclosure.

In accordance with still another feature of the invention, a waterproof screen is attached to the touch screen display.

In accordance with still a further feature of the invention, the plurality of domes minimizes radio frequency (RF) reflection and improves RF reception.

In accordance with a concomitant feature of the invention, the improvement in RF reception decreases a calculation time for measurements of the antenna alignment device.

Although the invention is illustrated and described herein as embodied in an alignment device and clamp, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 2 is a rear elevational view of an enclosure for the alignment device of FIG. 1 according to one exemplary embodiment;

FIG. 3 is side elevational view of the enclosure of FIG. 2;

FIG. 4 is a top perspective view of the enclosure of FIG. 2;

FIG. 5 is a side elevational view of the enclosure of FIG. 2;

FIG. 19 is a top perspective view of the enclosure of FIG. 17;

FIG. 20 is a bottom perspective view of the enclosure of FIG. 17;

FIG. 25 is a diagram of an example reflection signal;

FIG. 26 is an example of incoming radio frequency signals for a domed radome; and FIG. 27 is an example of incoming radio frequency signals for a flat radome.

DETAILED DESCRIPTION OF THE INVENTION

Figure 1:
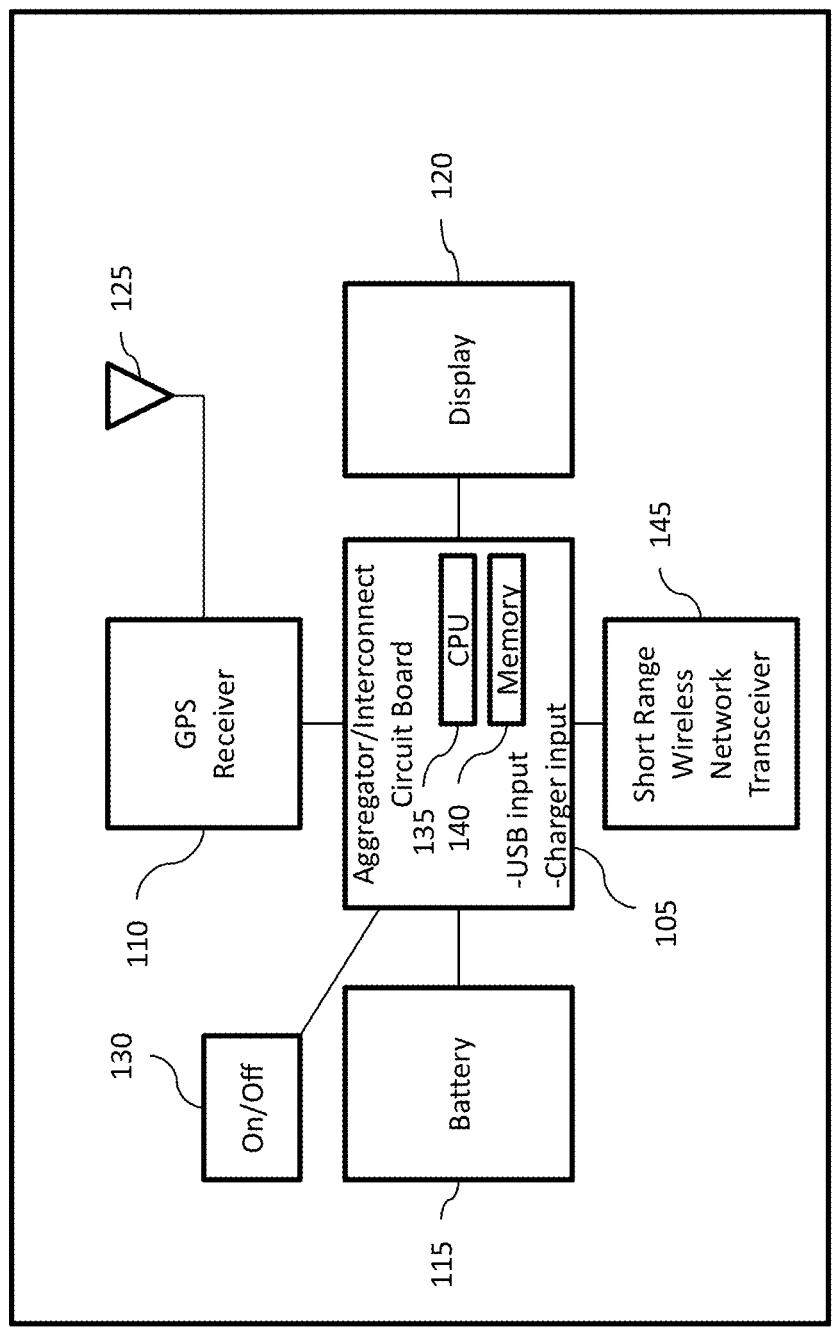
FIG. 1 is an exemplary embodiment of an alignment device.
Figure 6:
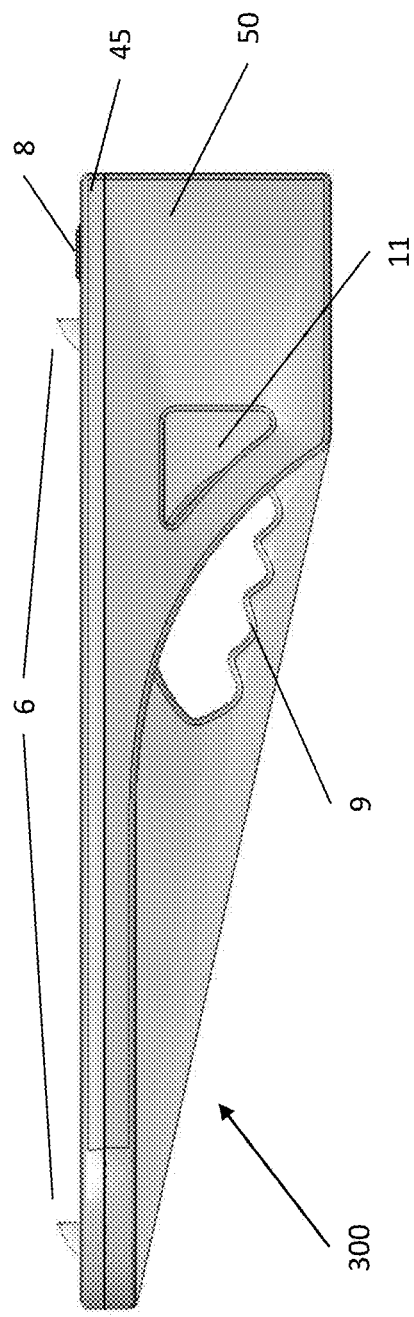
FIG. 6 is a side elevational view of a second exemplary embodiment of the enclosure of the alignment device of FIG. 1.
Figure 7:
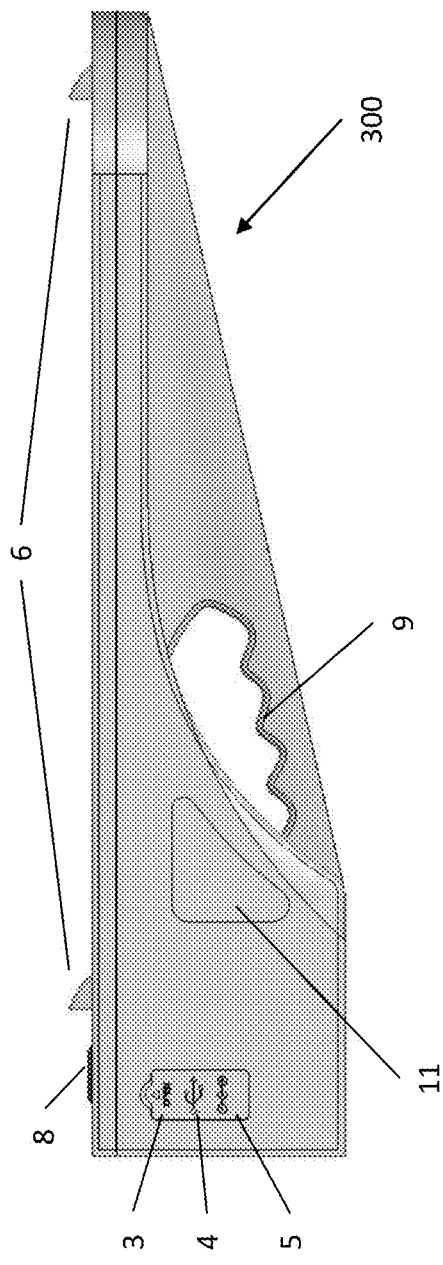
FIG. 7 is a side elevational view of the enclosure of FIG. 6.
Figure 8:
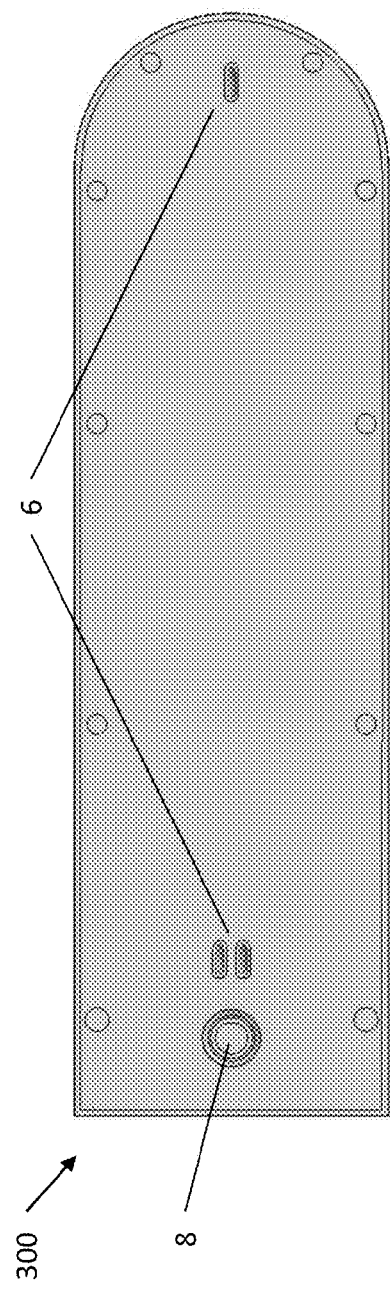
FIG. 8 is a top perspective view of the enclosure of FIG. 6.
Figure 9:
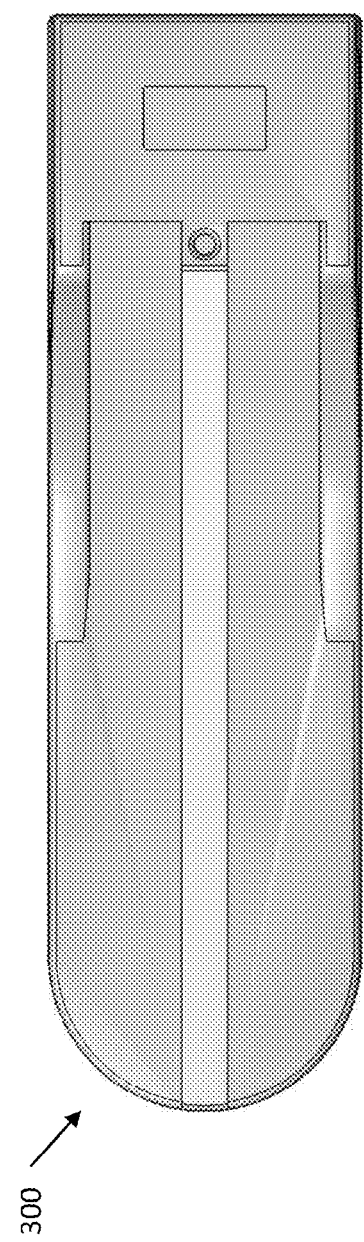
FIG. 9 is a bottom perspective view of the enclosure of FIG. 6.
Figure 11:
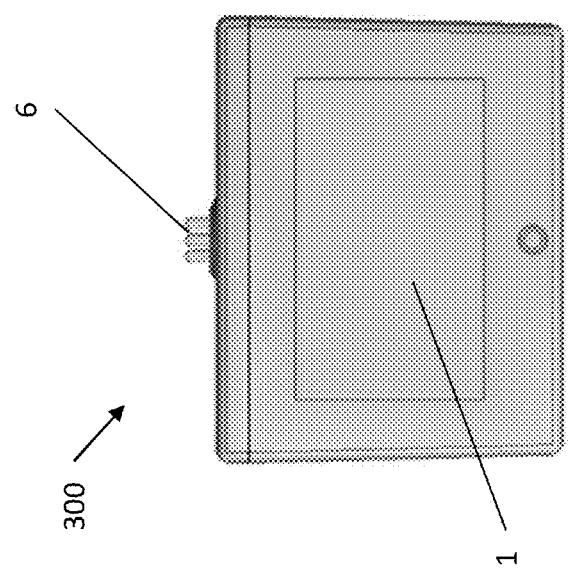
FIG. 11 is a rear elevational view of the enclosure of FIG. 6.
Figure 10:
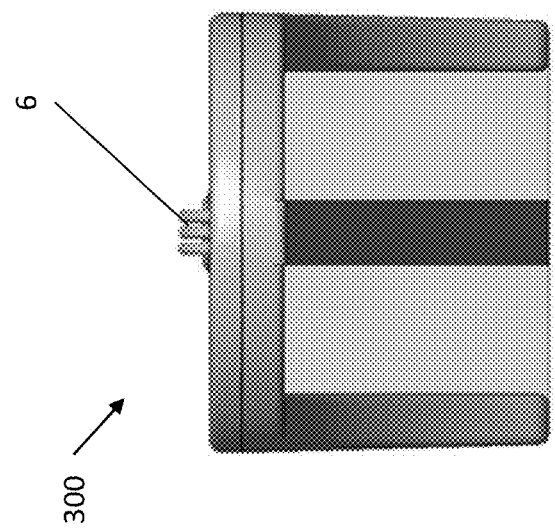
FIG. 10 is a front elevational view of the enclosure of FIG. 6.
Figure 12:
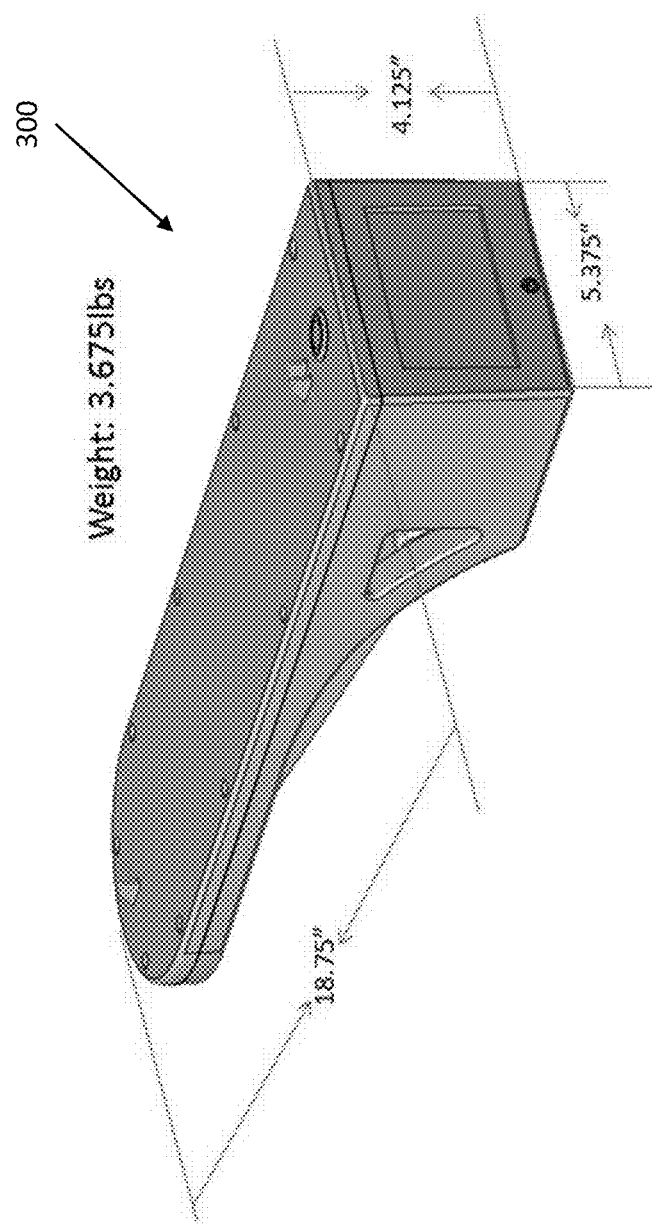
FIG. 12 is a perspective view of the enclosure of FIG. 6.
Figure 13:
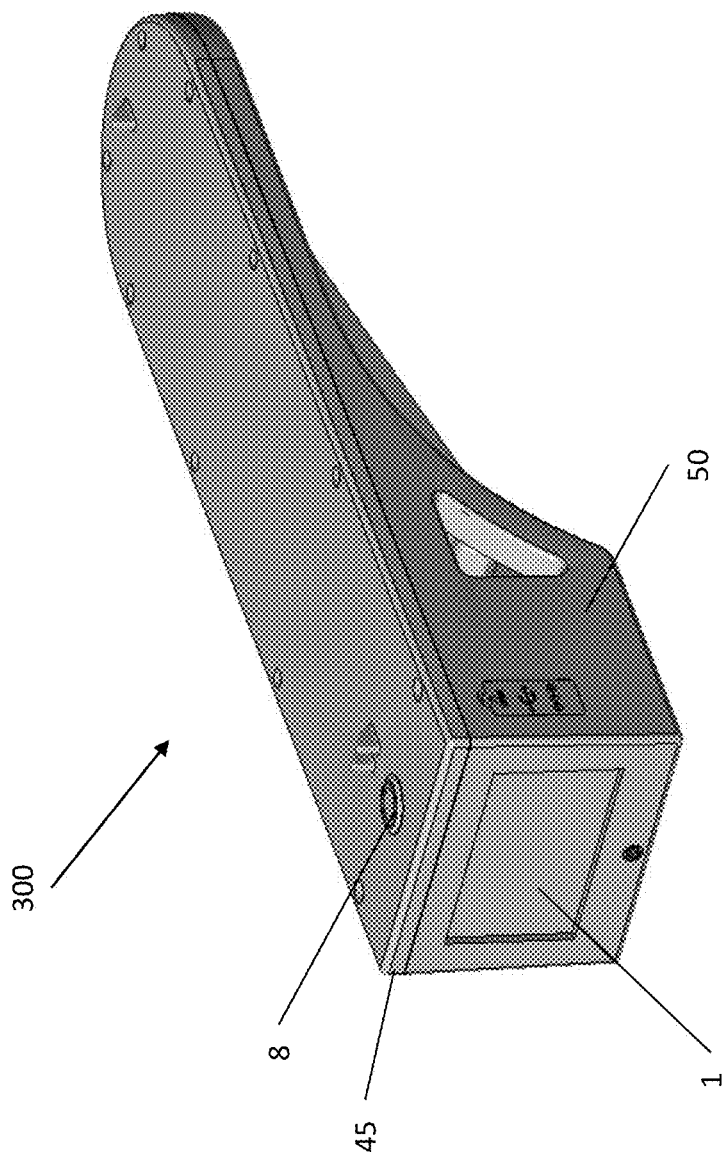
FIG. 13 is a perspective view of the enclosure of FIG. 6.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the invention described herein may be comprised of one or more conventional processors and unique stored program instructions that control the one or more processors to implement, in conjunction with certain non-processor circuits and other elements, some, most, or all of the functions of the alignment device described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of an antenna alignment device. The radio-frequency (RF) aligner, e.g., device 100, uses a global positioning system (GPS) receiver in order perform an antenna alignment. Device 100 houses components that include a battery 115, a GPS Receiver 110, GPS Antennas 125, a touch sensitive flat panel display 120, an on/off switch 130, a short range wireless network transceiver 145, and an interconnect circuit board 105.

The short range wireless network transceiver can be Bluetooth, WiFi, or any other appropriate short range wireless standard. In one embodiment, transceiver 145 is used to wirelessly import/export data, e.g., to retrieve saved measurement reports, for example, using a mobile device of a user.

Interconnect circuit board 105 includes one or more processors 135 (e.g., central processing unit (CPU) and one or more memory elements 140 (e.g., random access memory (RAM) and/or read only memory (ROM).

It should be understood that software modules running in the interconnect/aggregator circuit board 105 can be implemented as one or more physical devices that are coupled to the CPU 135 through a communication channel. Software running on device 100 can be represented by one or more software applications (or even a combination of software and hardware, e.g., using application specific integrated circuits (ASIC)), where the software is loaded from a storage medium, (e.g., a magnetic or optical drive or diskette, or a solid state drive (SSD)) and operated by the CPU 135 in the memory 140 of the interconnect circuit board 105. Examples of a solid state drive can be flash memory, a SSD hard drive, and a secure digital (SD) memory card. As such, software modules (including associated data structures) of the present invention can be stored on a computer readable medium, e.g., RAM memory, SSD, magnetic or optical drive or diskette and the like.

Device 100 houses all the components mentioned above within a small and light-weight enclosure 200 as shown in FIG. 2, FIG. 3, FIG. 4, and FIG. 5. Device 100 can also house the components mentioned above within a small light-weight enclosure 300 as shown in FIG. 6, FIG. 7, FIG. 8, FIG. 9, FIG. 10, FIG. 11, FIG. 12, and FIG. 13. Device 100 can also house the components mentioned above within a small lightweight enclosure 400 as shown in FIG. 17, FIG. 18, FIG. 19, FIG. 20, FIG. 21, FIG. 22, FIG. 23, and FIG. 24. Features of enclosure 200 also apply to enclosure 300 and vice versa. Likewise, features of enclosures 200 and 300 apply to enclosure 400 and vice versa. In one particular embodiment shown in FIG. 12, the device has a length of 18.75 inches, a width of 5.375 inches. In this embodiment, the rear portion of the enclosure 300 has a height of 4.125 inches and the weight of device 100, 300 is approximately 3.675 pounds.

Device 100 has a built-in touch sensitive flat panel display 1, 120 that is used as a graphical user interface. Device 100 also has a very sensitive GPS compass that is accurate to within ¾ of a degree.

The touch sensitive flat panel display 1, 120 is a built-in touch screen. Although a touch screen is not shown in enclosure 400, a touch screen like touch sensitive flat panel display 1, 120 can be included in space 31. Prior art alignment device makers do not tend to use touch screens because they create a significant amount of noise for the GPS. The touch sensitive flat panel display 1, 120 is placed or secured within a chamber of the enclosure 200, 300, 400. The touch screen chamber is shielded to reduce the amount of noise affecting the GPS system/readings. In one embodiment, the touch screen chamber is painted with copper paint to shield the emissions radiated from the display 1, 120 and thereby reduce interference with the GPS. In one embodiment, wiring internal to the enclosure for On/Off switch 8, 130 is also shielded.

In one embodiment, a screen is attached to touch sensitive flat panel display 1, 120 for waterproofing. In one embodiment, the screen is attached using double sided tape, e.g., 3M VHD tape.

The enclosure 200, 300, 400 includes a top portion 45, 55 and a bottom portion 50, 60. In one embodiment for enclosures 200, 300, the top portion 45 is substantially flat. In one embodiment, the top portion 55 of enclosure 400 includes one or more domes 13, 14. The top portion 45, 55 and bottom portion 50, 60 of enclosure 200, 300, 400 are attached to form a single mold, e.g., enclosure 200, 300, 400, that includes all components needed for the alignment device 100, 200, 300, 400.

The point where the top portion 55 and bottom portion 60 of enclosure 400 meet is obscured by bumper 65. Bumper 65 is used to protect and ruggedize enclosure 400. Bumper 65 can also be used to protect and ruggedize enclosures 200, 300. In one embodiment, bumper 65 is a rubber bumper.

The enclosure 200, 300, 400 of the present alignment device has a single radome, e.g., antenna cover, for a plurality of antennas. In one embodiment, the top portion 45, e.g., the cover of enclosure 200, 300, is substantially flat and is one piece.

As stated above, in one embodiment, the top portion 55, e.g., the cover of enclosure 400 includes one or more domes 13, 14. The one or more domes 13, 14 correspond to, and are situated above, a respective one or more antennas (not shown) within the enclosure. In this embodiment, the top portion 55, e.g., the cover of enclosure 400, although including domes 13, 14, is still one piece.

Thus, the top portion 45, 55 of the enclosure 200, 300, 400 can be considered a single radome. Having a single radome, among other advantages, reduces assembly costs, uses less parts, and provides less points of failure. Prior art alignment devices tend to either have multiple housings or multiple radomes for their antennas. For the purposes of this disclosure, a radome is defined as a protective cover for one or more GPS antennas that is transparent to radio waves.

The enclosure 200, 300, 400 has a mounting knob 2, which may, in one embodiment, comprise a single Pem-nut, for mounting to an antenna clamp or directly to an antenna. The mounting knob 2 can also be used to mount the device on a standard tri-pod or monopod. When the enclosure 200, 300, 400 is used on a standard tri-pod or monopod, the alignment device can be used on the ground to provide a rough verification for the device operator.

In one embodiment, enclosure 200, 300, 400 has an attachment mechanism to keep the enclosure from falling. The attachment mechanism has one or more openings, e.g., carabiner attachment 11, 21 for attaching a lanyard or rope that is used to tie off or tie-down the device in case of an accidental drop. In one embodiment, enclosure 200, 300 has built-in sighting notches 6 that provide accurate positioning.

In one embodiment, the enclosure 200, 300 has a built-in handle 9, 19 for the purpose of carrying the device.

Enclosure 200, 300 has a built-in universal serial bus (USB) communication port 4 that can be used to retrieve saved measurement reports and update firmware. Enclosure 200, 300 also has a built-in battery charging port 5 that is used to charge the battery. In one embodiment, the battery may be a lithium ion battery. The USB communication port and battery charging port are coupled to circuit board 105. Enclosure 200, 300 has a built-in on and off push button. In one embodiment, the enclosure 200, 300 has a rubber cover 3 that is used to protect the USB and charging ports from dust and moisture. Although not shown in enclosure 400, rubber cover 3, the built-in USB communication port 4, and the built-in battery charging port 5, can be included in opening 23.

Enclosure 200, 300 has sighting guides 6 that are used, for example, with a monopod to remotely verify antenna azimuth.

GPS antennas (not shown) are within enclosure 200, 300, 400 and placed near the areas denoted by elements 7 in enclosures 200, 300 or under domes 13, 14 in enclosure 400. GPS antennas are used so that the device can display azimuth, latitude, longitude, height, date, and time. On/Off Switch 8, 130 is used power the device on and off. Although not shown in enclosure 400, On/Off Switch 8, 130 can be included in opening 18. Carrying handle 9, 19 is used to carry the device 100, 200, 300, 400. The monopod attachment hole 10 is used to attach a monopod to the device.

Figure 14:
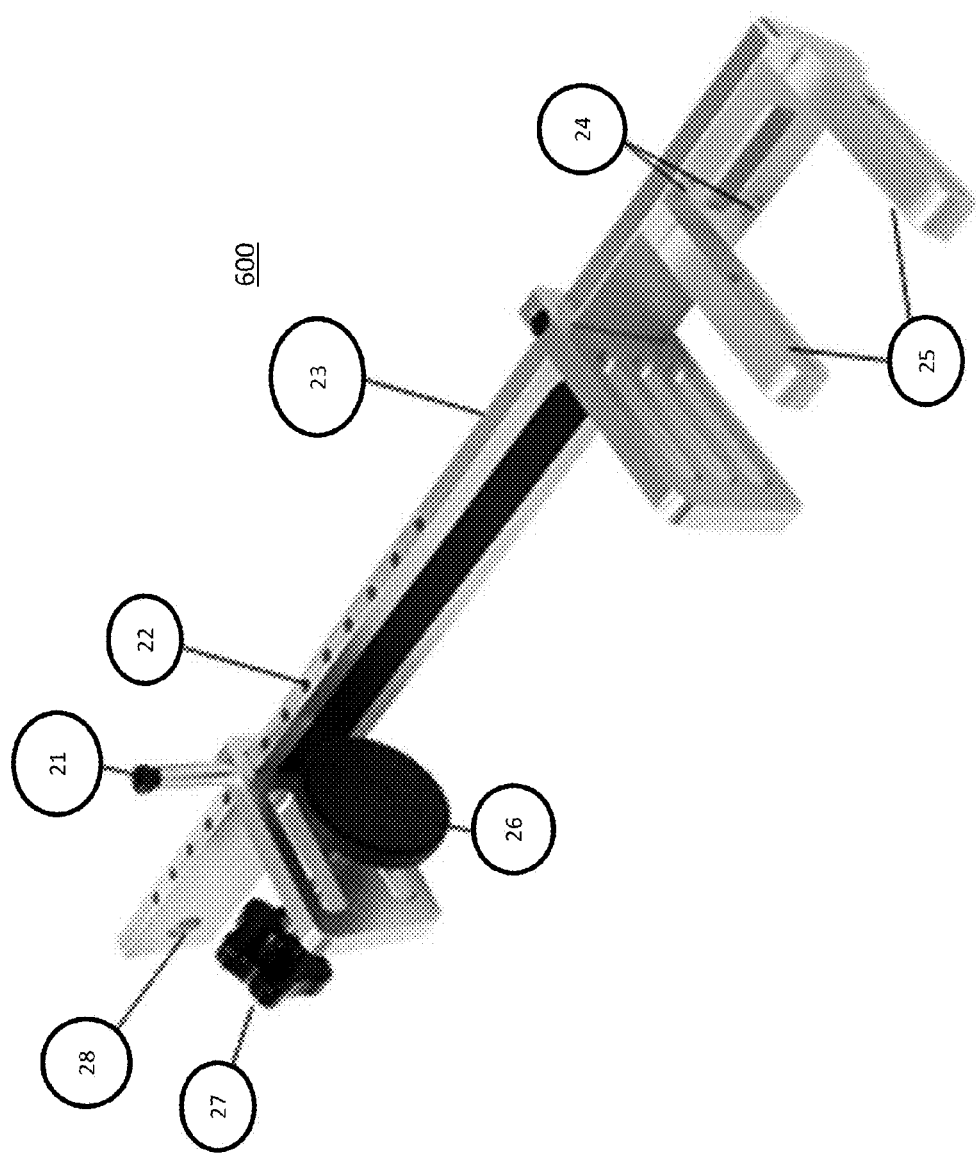
FIG. 14 is a perspective view of a clamp according to one exemplary embodiment.
Figure 15:
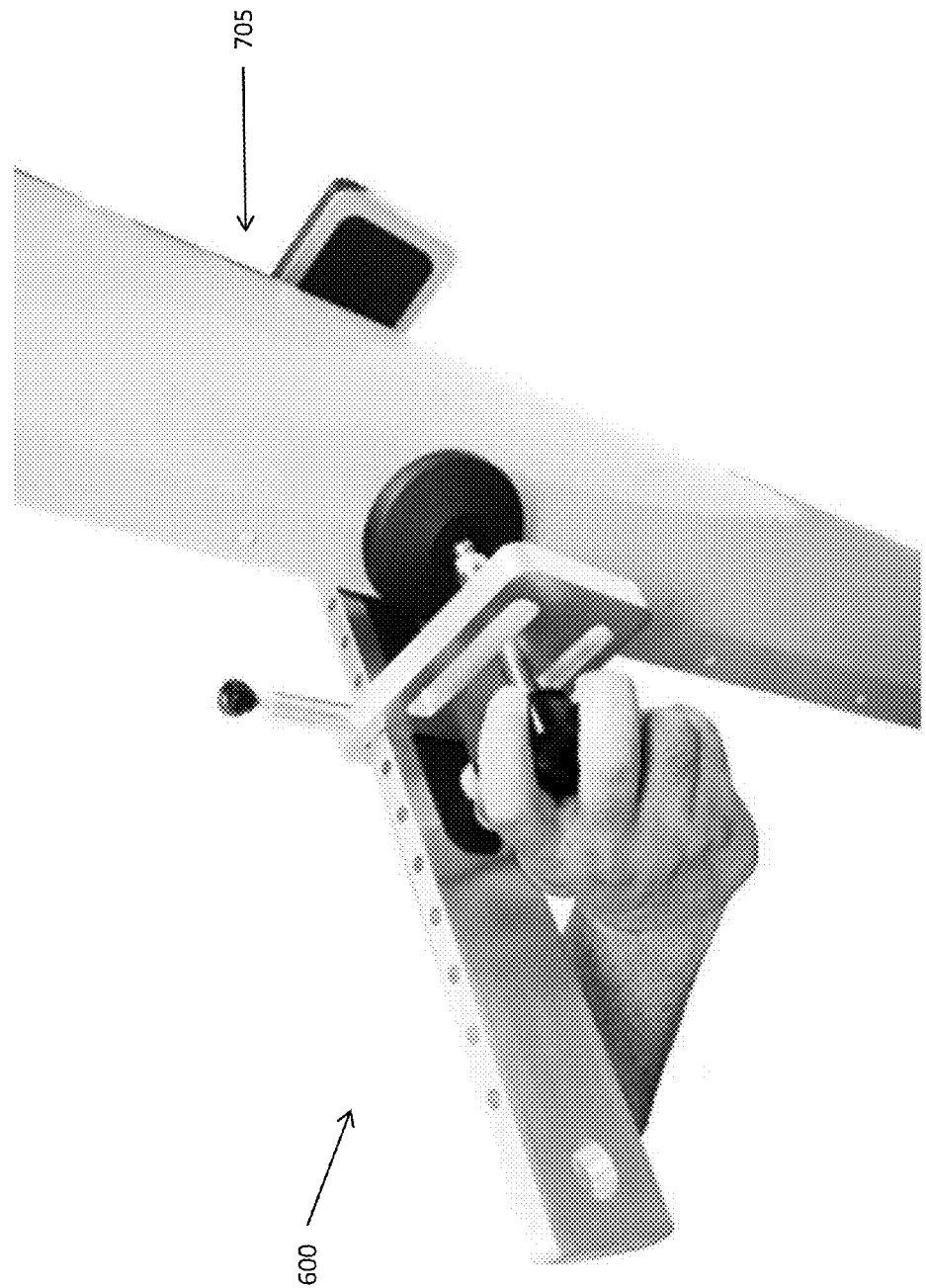
FIG. 15 is a perspective view of the clamp of FIG. 14 clamped to an antenna.
Figure 16:
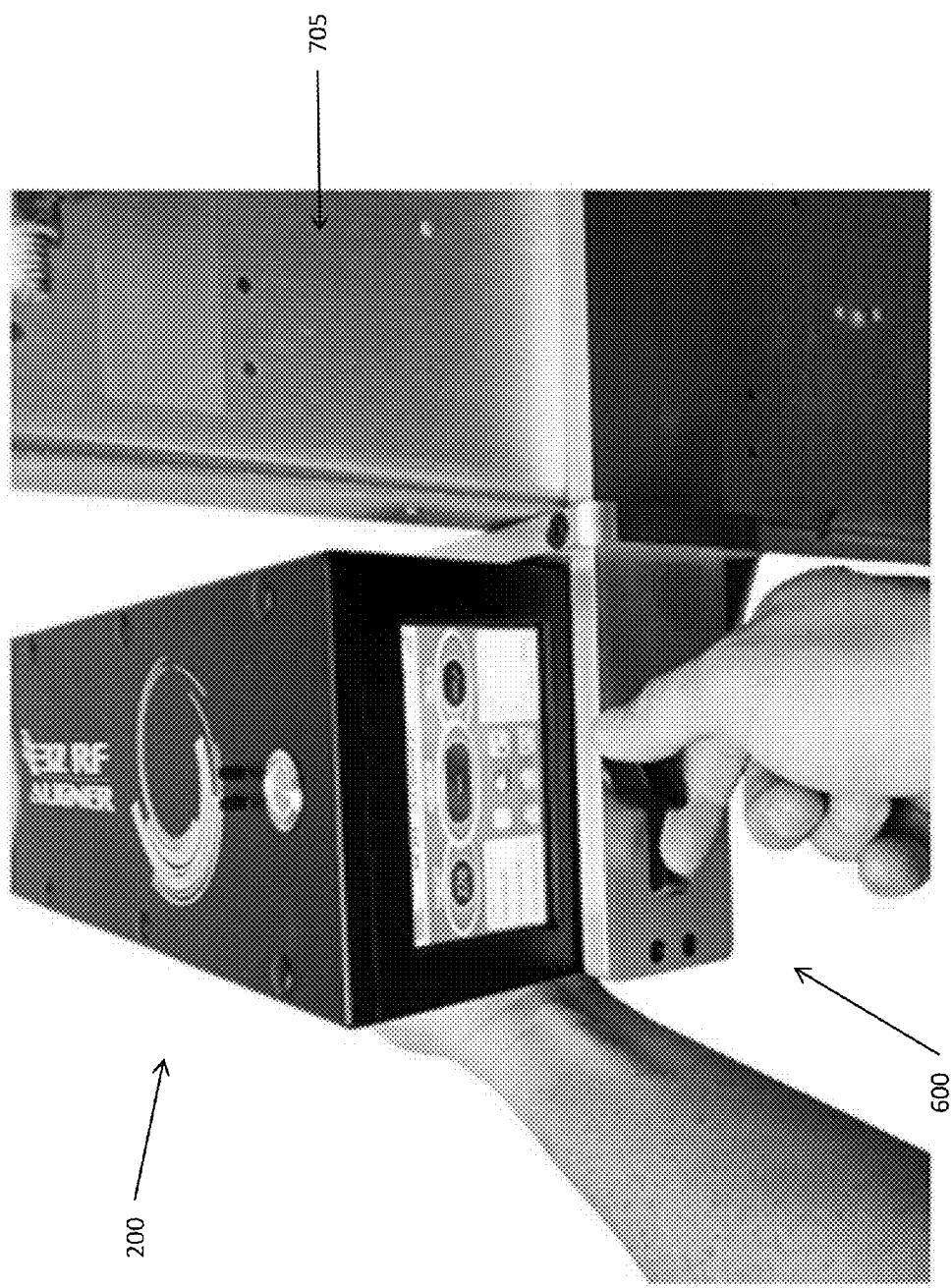
FIG. 16 is a partial perspective view of the clamp of FIG. 14 clamped to an antenna and holding the housing for the alignment device of FIG. 1, FIG. 2, FIG. 3, FIG. 4, and FIG. 5
Figure 17:
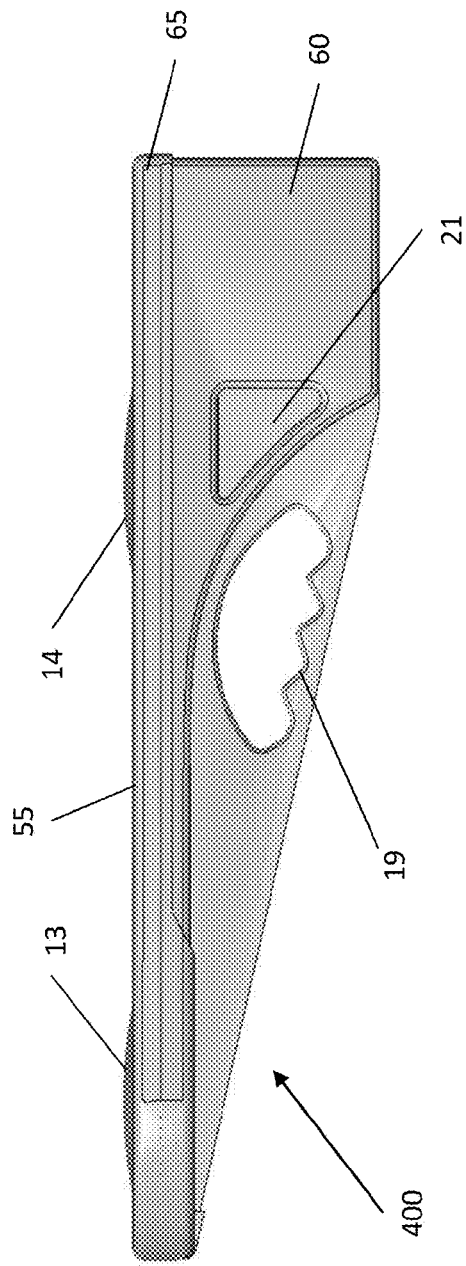
FIG. 17 is a side elevational view of a third exemplary embodiment of the enclosure of the alignment device of FIG. 1.
Figure 18:
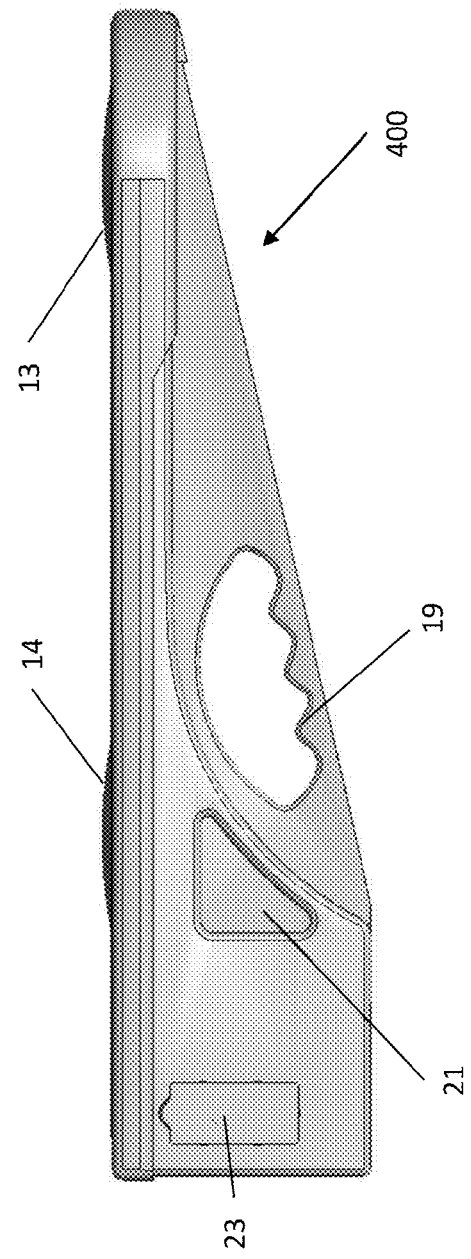
FIG. 18 is a side elevational view of the enclosure of FIG. 17.
Figure 22:
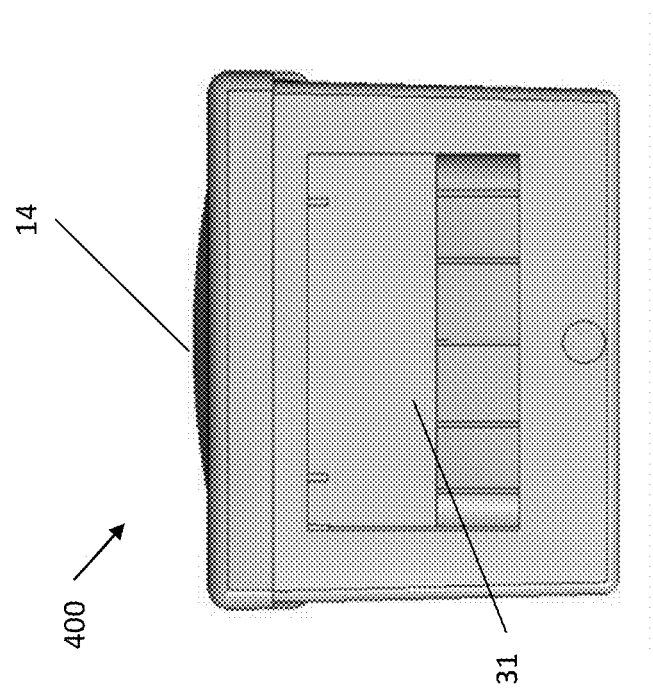
FIG. 22 is a rear elevational view of the enclosure of FIG. 17.
Figure 21:
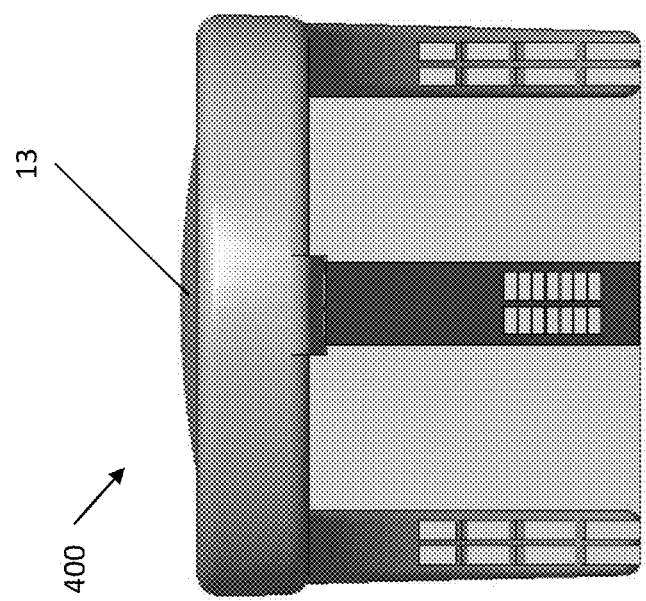
FIG. 21 is a front elevational view of the enclosure of FIG. 17.
Figure 23:
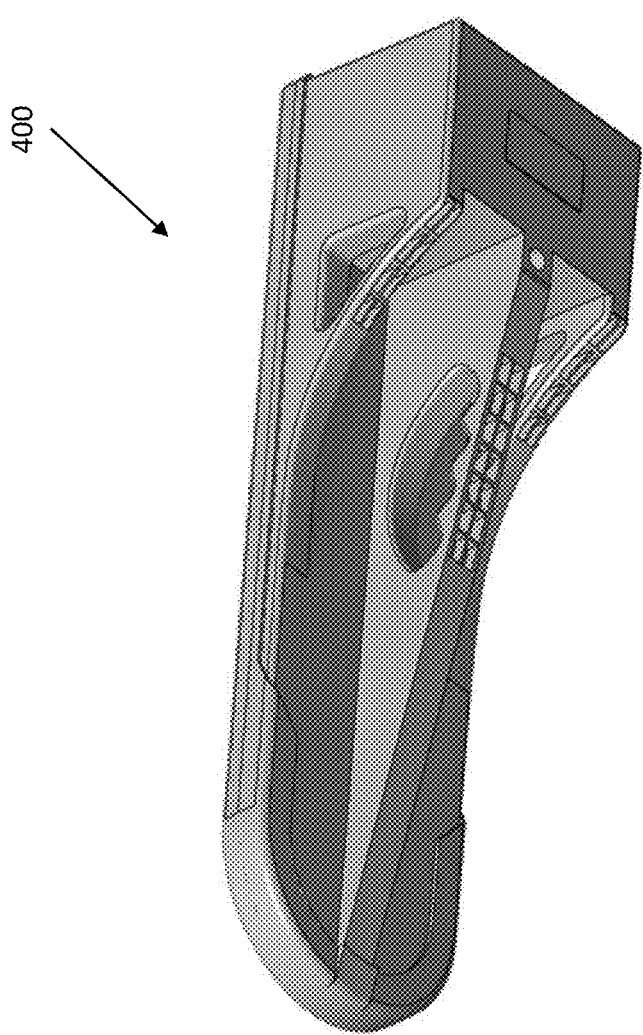
FIG. 23 is a perspective view of the enclosure of FIG. 17.
Figure 24:
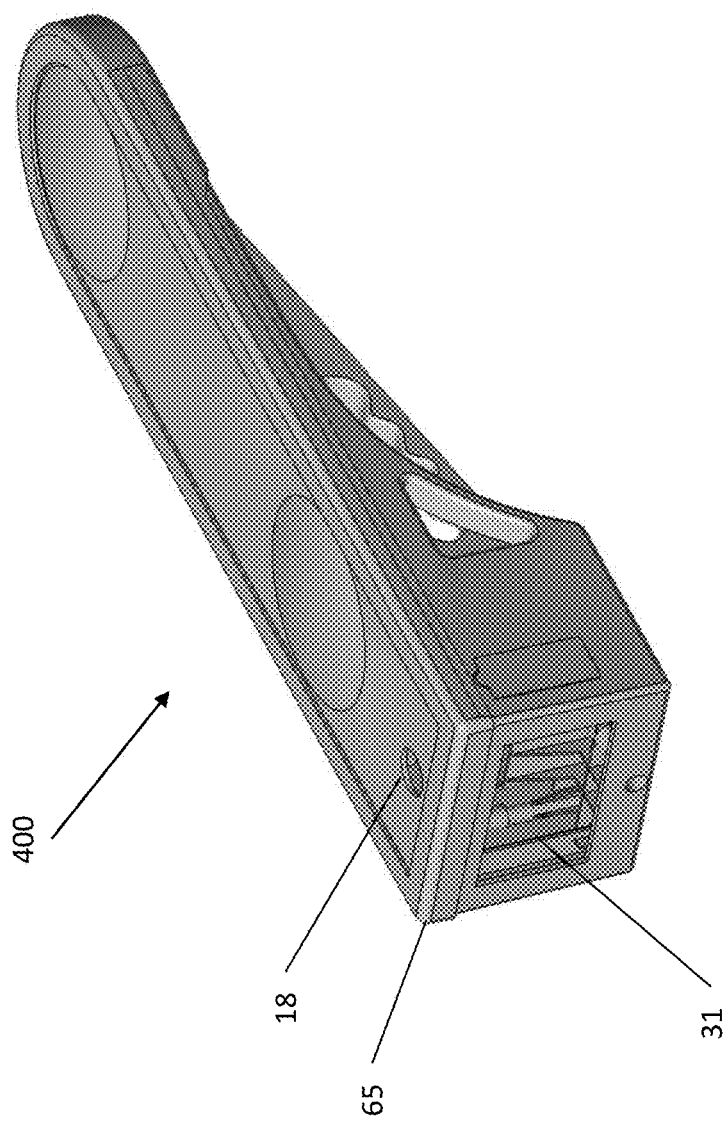
FIG. 24 is a perspective view of the enclosure of FIG. 17.

FIG. 14 is a universal antenna clamp 600. Clamp 600 attaches to a directional panel antenna shown in FIG. 15 and FIG. 16 as antenna 705. Clamp 600 also supports the enclosure 200, 300, 400 as shown in FIG. 16.

Clamp 600 attaches to the back of a directional panel antenna. Clamp 600 clamps the sides of an antenna in order to secure the clamp to an antenna. Clamp 600 supports multiple directional panel antenna widths. Clamp 600 has supporting arms that act as a support for the enclosure 200, 300, 400. Clamp 600 has a mounting hole used to affix the enclosure 200, 300, 400 to the universal antenna clamp 600. Clamp 600 has one opening used to attach a lanyard or rope that ties off the device in case of an accidental drop.

Clamp 600 includes an adjustment pin 21. The adjustment pin 21 is raised in order to adjust the width of the clamp 600. Pin holes 22 are used with the adjustment pin. Back bar 23 is aligned with a back bar of the antenna 705. Unit mounting holes 24 are used to mount the device 100, 200, 300, 400 with mounting knobs. Clamp mounting arms 25 are used to support the device 100, 200, 300, 400. A rubber compression pad 26 is used to affix the clamp 600 to the antenna 705. A tightening knob 27 is used to tighten the clamp 600 onto the antenna 705. A carabiner attachment hole 28 is used to carry or tie-off the antenna clamp.

The goal of designing domes on a radome is to minimize radio frequency (RF) reflection. The goal of device 100, 200, 300, 400 is to receive GPS signals from satellites in space. The highest RF penetration through a surface or radome occurs when the signal arrives orthogonal to the surface. As shown in the example reflection signal of FIG. 25, an incoming RF signal that is not orthogonal to the surface 2505 is reflected. As shown in FIG. 27, when there is a flat radome, only one angle exists for orthogonal penetration. With the domed radome of FIG. 26, many more angles exist for orthogonal penetration. Under ideal conditions a 10 to 20% improvement in RF reception can be achieved when using a domed radome. This 10 to 20% improvement in RF reception provided by the use of a domed radome provides a decrease in a calculation time for measurements made by the device 100, 200, 300, 400.

The built-in touch sensitive flat panel display 120 displays measurements derived by the GPS receiver and has the ability to take screen shots for later viewing. In one embodiment, the screen shot picture files are encrypted in order to ensure validity. In one embodiment, a code is used to encrypt a ".bmp" file in order to authenticate the screen shot. In addition to the screen shot, a text file with the raw data can also be provided. A user of the device 100, 200, 300, 400 can view files on the display 120, for example so that the user can check what was done, e.g., verify that the job was done correctly, before climbing down. In addition, validation software can be used when files from the device 100, 200, 300, 400 are uploaded from the device. The validation software can be used to verify that the results are actually from the device with the encryption code used for authentication.

A file menu of the device is presented on the display and is used to recall or review previously saved screen shots or reports to verify that the input data is correct. The input data can be, but is not limited to, antenna identifying information. The antenna identifying information can be an antenna site/location, an antenna sector, and/or an antenna position.

In prior art devices, the data is saved and post-processed later. Thus, users of prior art devices would not be aware of any mistakes that were made until after they left the site.

In one embodiment, device 100 has an improved GPS Performance/Boost mode, which reduces system noise in order to increase GPS performance. Every component, e.g., battery, display, etc., of the device 100, 200, 300, 400 emits a certain level of radiation. This emitted radiation causes a long delay in determining the azimuth. The present device 100, 200, 300, 400 provides a GPS boost mode that reduces noise in the entire system 100 to make a GPS signal stronger. This mode allows the determination of the azimuth (bearing) in approximately 30 seconds instead of 2 to 5 minutes. In one embodiment, the device 100, 200, 300, 400 reduces processor speed, no longer accesses random access memory (RAM), and lowers current consumption to reduce the noise of the entire system and improve GPS reception.

In one embodiment, the device 100, 200, 300 can be used on the ground as a surveying tool using sighting guides 6 of FIG. 3.

In one embodiment, device 100, 200, 300, 400 can be used to provide information that can be used in windmill technology. Device 100, 200, 300, 400 provides a correct reference for a first wind reading. Device 100, 200, 300, 400 is used as a compass so that the windmill can be moved in the direction of the wind.

In operation, device 100, 200, 300, 400 interprets data received from the GPS. The device 100, 200, 300, 400 can be used to align antennas and microwave dishes.

When the device 100, 200, 300, 400 is used to align microwave dish antennas, example calculations provided by the device may include azimuth, tilt, and distance. An accelerometer of GPS 110 is used to measure tilt. Given the latitude/longitude/height of the receiving dish, device 100, 200, 300, 400 calculates the azimuth and tilt, and also shows the distance, i.e., between the device (where are first dish is to be placed/aligned) and a second dish in a different location.

For a given position (e.g., latitude/longitude) and height above sea level, the device 100, 200, 300, 400 can calculate the direction between two points. For example, when the device 100, 200, 300, 400 is at a first point, the latitude/longitude and height are read and known by the device. The latitude/longitude and height for a second point can be provided as input to the device. From the information known for the first point and input for the second point, the device 100, 200, 300, 400 can calculate azimuth and tilt. In one embodiment, azimuth, tilt, and distance, can be shown to the user on the display 1, 120.

In one embodiment, opening 23 also includes a memory slot, e.g., a micro SD slot. Placing a memory slot in opening 23 allows a memory card to be replaced from the outside.

In one embodiment, measurements are averaged rather than taking instantaneous measurements. For example, a particular measurement by device 100, 200, 300, 400 can be the average of 100 measurements.

In one embodiment, device 100, 200, 300, 400 includes a calibration feature. Then the system is turned on, a GPS date is read as "day 1" and an expiration date calculated from "day 1" can be printed on every screen shot of displayed measurements taken from the device 100, 200, 300, 400.

Using prior art devices, it is difficult to align microwave dishes because the operator cannot see the second point. Possible obstructions to seeing the second point include fog, buildings, etc. Prior art methods for aligning microwave dishes used balloons, lasers, flags, two teams using signal strength meters, and other methods to assist in aligning the microwave dish. Using the alignment device of the present disclosure, the second point does not have to be visible in order to properly align the microwave dishes.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An antenna alignment device, comprising:
a handheld enclosure, the enclosure comprising:
   a top portion comprising a single radome having a plurality of domes;
   a bottom portion, the top portion and the bottom portion attached to form a single mold; and the single mold housing:
      a global positioning system (GPS) receiver;
      a plurality of GPS antennas, each of the plurality of GPS antennas covered by the single radome and a respective dome of the plurality of domes;
      an interconnect circuit board; and
      a touch screen display exposed to the environment on a surface of one of the top portion and the bottom portion and communicatively connected to the interconnect circuit board, the at least one GPS receiver and the plurality of GPS antennas operate together to receive GPS signals and determine an azimuth of the enclosure heading accurate at least to within approximately ¾ of a degree.

2. The antenna alignment device of claim 1, further comprising a shielded chamber within the enclosure that secures the touch screen display.

3. The antenna alignment device of claim 2, wherein shielding of the shielded chamber comprises copper paint.

4. The antenna alignment device of claim 1, further comprising internal shielded wiring for an ON/OFF switch of the enclosure.

5. The antenna alignment device of claim 1, further comprising a built-in carrying handle for the enclosure.

6. The antenna alignment device of claim 5, wherein the built-in carrying handle is part of the bottom portion of the enclosure.

7. The antenna alignment device of claim 1, further comprising an attachment mechanism to keep the antenna alignment device from falling.

8. The antenna alignment device of claim 7, wherein the attachment mechanism comprises at least one opening within the enclosure that allows the antenna alignment device to be tied down.

9. The antenna alignment device of claim 8, wherein the at least one opening is part of the bottom portion of the enclosure.

10. The antenna alignment device of claim 1, wherein the enclosure further comprises:
   a memory slot;
   a universal serial bus (USB) port; and
   a battery charging port.

11. The antenna alignment device of claim 10, wherein the enclosure further comprises a cover that protects the memory slot, the USB port, and the battery charging port.

12. The antenna alignment device of claim 1, wherein the enclosure further comprises a mounting knob.

13. The antenna alignment device of claim 12, wherein the mounting knob comprises a single nut.

14. The antenna alignment device of claim 1, wherein the single mold further houses a short range wireless transceiver.

15. The antenna alignment device of claim 1, further comprising a bumper attached to the enclosure.

16. The antenna alignment device of claim 1 further comprising a waterproof screen attached to the touch screen display.

17. The antenna alignment device of claim 1, wherein the plurality of domes minimizes radio frequency (RF) reflection and improves RF reception.

18. The antenna alignment device of claim 17, wherein the improvement in RF reception decreases a calculation time for measurements of the antenna alignment device.

19. The antenna alignment device of claim 1, wherein the enclosure:
   has an overall length of approximately 18.75 inches, an overall width of approximately 5.375 inches, and a rear portion having a height of approximately 4.125 inches; and
   a weight is approximately 3.675 pounds such that the size and weight is sufficient for a person to carry the enclosure with one hand.

* * * * *